UNITED STATES PATENT OFFICE.

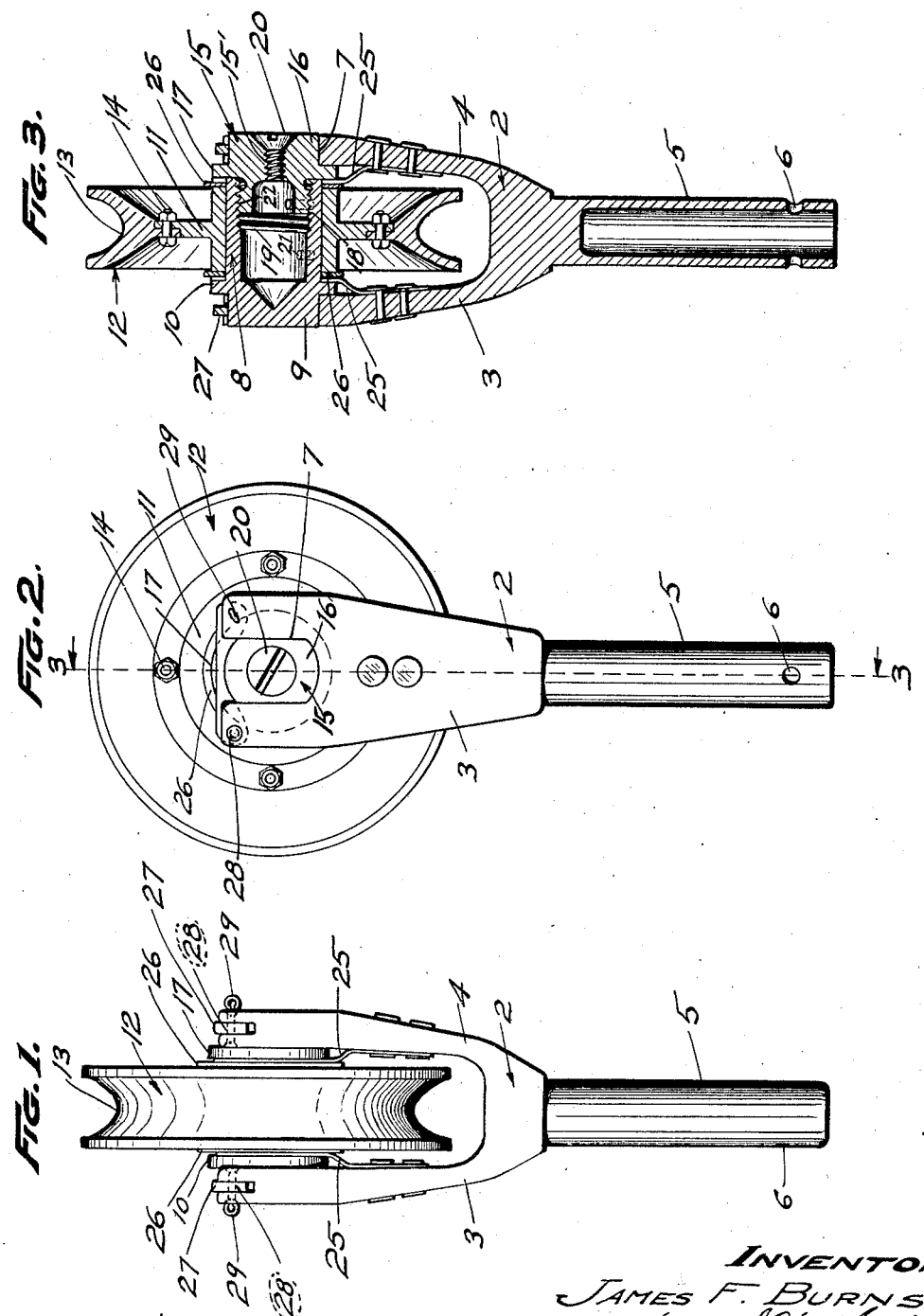

JAMES F. BURNS, OF LOS ANGELES, CALIFORNIA.

TROLLEY-WHEEL.

1,362,390.  Specification of Letters Patent.  Patented Dec. 14, 1920.

Application filed December 23, 1919. Serial No. 346,964.

*To all whom it may concern:*

Be it known that I, JAMES F. BURNS, a citizen of the United States, residing at Los Angeles, in the county of Los Angeles and State of California, have invented new and useful Improvements in Trolley-Wheels, of which the following is a specification.

This invention relates to trolley wheels, and has for its object to improve the facility for oiling the same, and the invention consists of the construction and details, an embodiment of which is illustrated in the accompanying drawings and described and claimed herein.

Figure 1 is a front or edge view of the improved trolley wheel or harp.

Fig. 2 is a side elevation of the improved harp.

Fig. 3 is a section on line 3—3 of Fig. 2.

The device comprises a suitable form of yoke or fork 2 comprising upwardly extending bearing arms or side members 3 and 4, and below the crotch of the fork is extended a socket portion 5 having pin holes 6 to secure the attachment of the device to the usual trolley pole not shown.

The side member 3 is shown in Figs. 2 and 3 as downwardly slotted as at 7 and is designed to receive a removable, nonrotary axle or journal member shown as comprising a sleeve-like hollow block or cylinder 8 having at one end a non-polygonal projecting part 9 complementary to the upwardly extending slot 7 so as to be readily slipped into place thereon, the axle having a circumferential collar or shoulder 10 designed to abut against the adjacent inner surface of the side arm 3. The central or body portion of the axle is turned cylindrical to receive the hub portion 11, in the present case shown as having a removable and renewable trolley wheel 12 provided with the usual circumferential groove 13 to take a trolley wire. The removable rim 12 may be secured to the web of the hub 11 as by bolts or other suitable fastening means 14.

While one end of the hollow box or axle is shown as closed by an integral body part the opposite end is closed by a removable cap or bushing 15 having a head 16 of non-polygonal form and similarly shaped to the end 9 so that the head 16 will fit in the slotted upper end of the side arm 4 in a manner similar to the construction shown in Fig. 2.

The removable cap 15 has a cylindrical flange 17 and a threaded cylindrical part 18 to engage complementary internal threads 19 on the interior of the hollow axle 8. The outer end of the cap 15 is provided with an aperture 15' covered by a closure here shown as comprising a countersunk screw 20, and when the latter is removed a charge of oil or grease can be injected into the chamber of the sleeve or hollow axle 8 thus enabling the oiling of the parts without requiring the disassembling or dismantling of the wheel organization. The oil or grease may flow outwardly to oil the running surface of the hub of the wheel by passing through apertures 21 a suitable number of which are appropriately located in the axle 8, and if desired also in the threaded part of the cap 15 as at 22.

The wheel 12 is normally maintained yieldingly in a medial position between the side arms 3 and 4 through means of suitable forked-shaped springs 25 that are secured on the inner faces of the arms 3 and 4, and these springs normally press against interposed renewable washers or wear rings 26 disposed adjacent the end faces of the hub 11.

The assembled axle and wheel with the washers 26 arranged in place can be readily passed into place so that the end 9 of the axle and the end 16 of the cap 15 will pass into the open slots 7 and the forked ends of the springs 25 properly slipped between the collars 10 and 17 and the adjacent washers 26. Having been thus assembled locking links 27 pivoted as at 28 in the upper slotted ends of the side arms 3—4 can then be thrown into the closing position across the mouths of the slots and fastened as by a cotter pin or other suitable means 29.

Various changes may be made without departing from the spirit of my invention as claimed.

I claim:

1. In a trolley harp, an axle comprising co-axial, inter-threaded chamber and cap members forming an oil box, one of said parts having an axially extending filling hole, and a closure plug received in said hole.

2. In a trolley harp, an axle comprising co-axial, inter-threaded chamber and cap members forming an oil box, and a closure for a filling hole in one of said parts, each of said parts having a non-circular head to interlock against rotation in the harp yoke.

In testimony whereof I have signed my name to this specification.

JAMES F. BURNS.